US008972511B2

(12) United States Patent
Freire et al.

(10) Patent No.: US 8,972,511 B2
(45) Date of Patent: Mar. 3, 2015

(54) METHODS AND APPARATUS FOR ANALYZING SOCIAL MEDIA FOR ENTERPRISE COMPLIANCE ISSUES

(75) Inventors: Otavio R. Freire, Charlottesville, VA (US); James P. Zuffoletti, Charlottesville, VA (US); Ruben Jimenez, Flushing, NY (US); Matthew A. Prentis, Keswick, VA (US); Brian C. Carr, Shawnee, KS (US)

(73) Assignee: OpenQ, Inc., Charlottesville, VA (US)

( * ) Notice: Subject to any disclaimer, the term of this patent is extended or adjusted under 35 U.S.C. 154(b) by 0 days.

(21) Appl. No.: 13/606,623

(22) Filed: Sep. 7, 2012

(65) Prior Publication Data
US 2013/0339457 A1 Dec. 19, 2013

Related U.S. Application Data

(60) Provisional application No. 61/660,872, filed on Jun. 18, 2012.

(51) Int. Cl.
*G06F 15/16* (2006.01)
*G06F 21/10* (2013.01)
*G06Q 20/12* (2012.01)

(52) U.S. Cl.
CPC ............. *G06F 21/10* (2013.01); *H04L 2209/60* (2013.01); *G06Q 20/1235* (2013.01); *Y10S 705/901* (2013.01); *Y10S 705/904* (2013.01)
USPC ............................ 709/206; 705/901; 705/904

(58) Field of Classification Search
USPC ................................... 709/206; 705/901, 904
See application file for complete search history.

(56) References Cited

U.S. PATENT DOCUMENTS

| | | |
|---|---|---|
| 5,266,944 A | 11/1993 | Carroll et al. |
| 7,233,961 B2 | 6/2007 | Sampson |
| 7,496,628 B2 | 2/2009 | Arnold et al. |
| 7,568,034 B1 | 7/2009 | Dulitz et al. |
| 7,689,563 B1 | 3/2010 | Jacobson |
| 7,725,098 B1 | 5/2010 | Claudatos et al. |
| 7,903,549 B2 | 3/2011 | Judge et al. |
| 7,917,938 B2 | 3/2011 | Jacobson |
| 7,937,319 B2 | 5/2011 | Kennis et al. |
| 7,962,616 B2 | 6/2011 | Kupferman et al. |
| 8,028,030 B2 | 9/2011 | Edlund et al. |

(Continued)

OTHER PUBLICATIONS

Written Opinion of the International Search Report for International Application No. PCT/US2012/46091 dated Oct. 4, 2013.

*Primary Examiner* — Shirley Zhang
(74) *Attorney, Agent, or Firm* — Cooley LLP

(57) ABSTRACT

In some embodiments, a non-transitory processor-readable medium includes code that causes a processor to receive, at a compliance device, a message from a source communication device addressed to a destination communication device. The code causes the processor to analyze at a context engine, the content of the message to determine a first risk level associated with a preference of an organization. The code further causes the processor to analyze at a regulatory engine, the content of the message to determine a second risk level associated with a regulatory standard of a specific industry and to define a composite risk level based on the first risk level and the second risk level. The code further causes the processor to send a notification to an administrator if the composite risk level satisfies a criterion, and to send the message to the destination communication device irrespective of the composite risk level.

24 Claims, 6 Drawing Sheets

(56) References Cited

U.S. PATENT DOCUMENTS

| | | |
|---|---|---|
| 8,064,898 B2 | 11/2011 | Carnall |
| 8,086,578 B2 | 12/2011 | Gosnell |
| 8,250,158 B2* | 8/2012 | Arnold et al. ............... 709/206 |
| 2004/0205334 A1* | 10/2004 | Rennels ....................... 713/154 |
| 2007/0025536 A1 | 2/2007 | Claudatos et al. |
| 2007/0043866 A1 | 2/2007 | Garbow et al. |
| 2007/0230486 A1 | 10/2007 | Zafirov |
| 2008/0177834 A1* | 7/2008 | Gruhl et al. .................. 709/204 |
| 2008/0189380 A1* | 8/2008 | Bosworth et al. ............ 709/207 |
| 2008/0282338 A1 | 11/2008 | Beer |
| 2009/0192784 A1 | 7/2009 | Cole et al. |
| 2009/0198488 A1 | 8/2009 | Vigen |
| 2009/0216882 A1* | 8/2009 | Britton et al. ................ 709/224 |
| 2010/0115263 A1* | 5/2010 | Patterson .................... 713/150 |
| 2010/0146269 A1* | 6/2010 | Baskaran ..................... 713/165 |
| 2010/0318642 A1 | 12/2010 | Dozier |
| 2011/0209196 A1* | 8/2011 | Kennedy ......................... 726/1 |
| 2011/0314092 A1* | 12/2011 | Lunt et al. .................... 709/203 |
| 2012/0016794 A1 | 1/2012 | Orr et al. |
| 2012/0216246 A1* | 8/2012 | Brennan et al. .................. 726/1 |

* cited by examiner

METHODS AND APPARATUS FOR ANALYZING SOCIAL MEDIA FOR ENTERPRISE COMPLIANCE ISSUES

CROSS-REFERENCE TO RELATED APPLICATION

This application claims priority to and the benefit of U.S. Provisional Patent Application Ser. No. 61/660,872, filed Jun. 18, 2012, and titled "Methods And Apparatus For Analyzing Social Media For Enterprise Compliance Issues," which is incorporated herein by reference in its entirety.

BACKGROUND

Some embodiments described herein relate generally to methods and apparatus for analyzing social media for enterprise compliance issues. Such embodiments can include, for example, a web-based compliant context machine learning driven social media monitoring system.

The term "social media" refers to online social networks that connect people who share interests and/or activities. Some known social media services are web-based and provide a variety of ways for users to interact such as, for example, via feeds, posts, electronic mail (email), file sharing, social listening, instant messaging services, and/or the like. Examples of some social media platforms include, but are not limited to, Facebook, Twitter, Yelp, and so forth.

In recent years, communication via social media platforms has rapidly increased. Social media communication is large, uncontrolled, and growing. Ineffective monitoring or lack of monitoring of communication between employees of an enterprise (such as hospitals and pharmaceutical companies), and other (potentially competing) enterprises via various social media based platforms can lead to undesirable consequences. One such undesirable consequence can be unwanted, unnecessary and potentially damaging leaks of confidential information such as patient medical records, prescription drug synthesis procedures, and/or the like.

Furthermore, the requirements of the Securities and Exchange Commission, National Association of Securities Dealers, the Health Insurance Portability and Accountability Act of 1996 (HIPAA), the Sarbanes-Oxley Act of 2002, the Food and Drug Administration regulations regarding off-label promotion of drugs as well as reporting requirements of adverse events in medications in addition to various anti-harassment and anti-discrimination laws are among the over 10,000 legal and regulatory requirements that may give rise to a need on the part of an enterprise to be able to monitor, record, archive, index, retrieve, analyze, report and/or control employee (or other user) communications in various social media platforms.

Accordingly, a need exists for methods and apparatus that can allow enterprises to develop effective compliance mechanisms to monitor communication between employees (e.g., doctors, nurses, and support staff), patients and other companies (e.g., drug companies, medical device companies) via various social media based platforms.

SUMMARY

In some embodiments, a non-transitory processor-readable medium includes code that causes a processor to receive, at a compliance device, a message from a source communication device addressed to a destination communication device. The code causes the processor to analyze at a context engine, the content of the message to determine a first risk level associated with a preference of an organization. The code further causes the processor to analyze at a regulatory engine, the content of the message to determine a second risk level associated with a regulatory standard of a specific industry and to define a composite risk level based on the first risk level and the second risk level. The code further causes the processor to send a notification to an administrator if the composite risk level satisfies a criterion, and to send the message to the destination communication device irrespective of the composite risk level.

DETAILED DESCRIPTION

Figure 1:
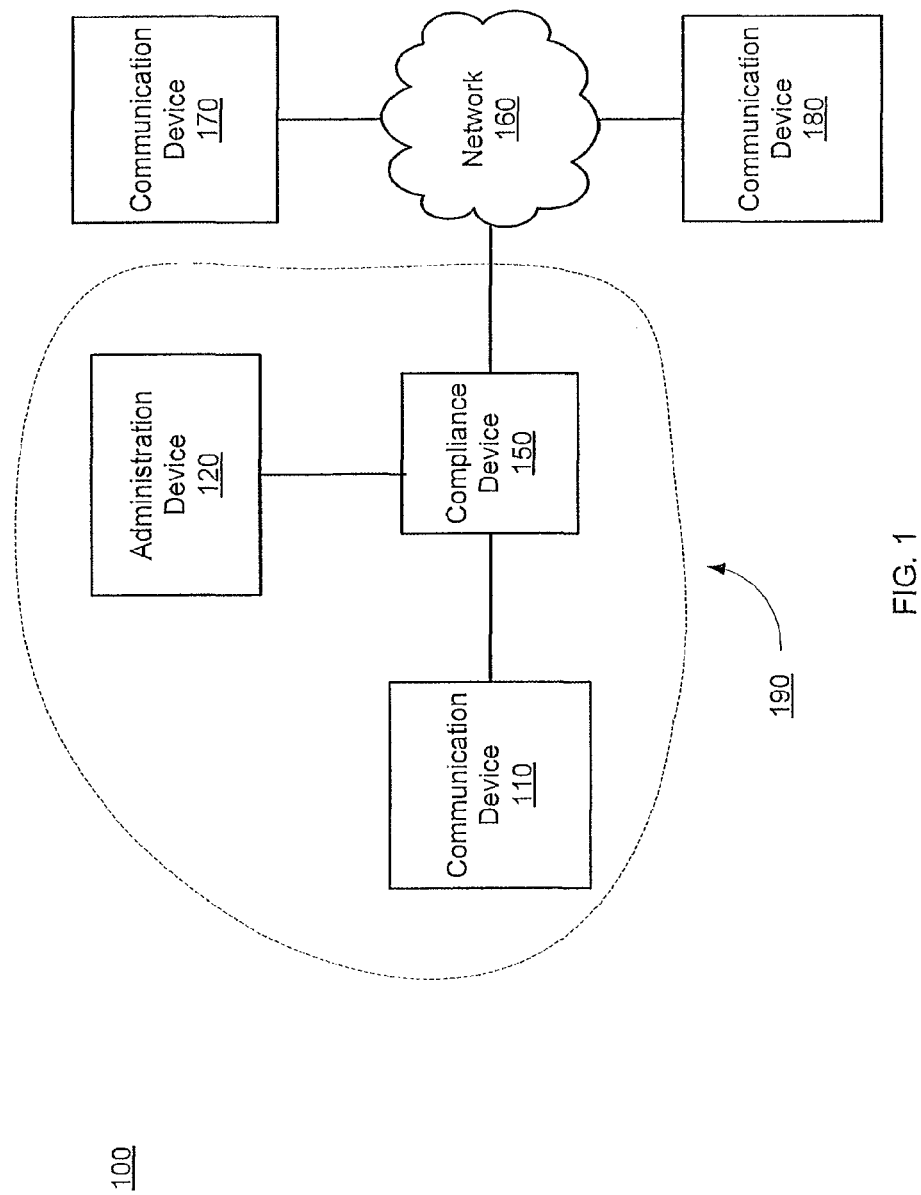
FIG. 1 is a schematic illustration of a system for monitoring and analyzing communications for enterprise compliance issues, according to an embodiment.

In some embodiments, a non-transitory processor-readable medium includes code representing instructions to be executed by a processor that causes the processor to receive, at a compliance device, a message from a source communication device that is addressed to a destination communication device. The code causes the processor to analyze at a context engine, the content of the message to determine a first risk level associated with the content of the message. The first risk level can be associated with a preference (or policy) of an organization and can be assembled by the organization that chooses specific language facets to include in their preferences or policies. The code further causes the processor to analyze at a regulatory engine, the content of the message to determine a second risk level associated with the content of the message. The second risk level can be associated with a regulatory standard of a specific industry. The code causes the processor to define a composite risk level based at least in part on the first risk level and the second risk level, and to send a notification to an administrator if the composite risk level satisfies a criterion. Additionally the code causes the processor to send the message to the destination communication device irrespective of the composite risk level.

In some embodiments, the second risk level can be determined by the use of "signatures". As used herein, a signature is a structured model that analyzes text in a massage and in some cases can also use results of external compliance analysis for finding a specific pattern in the text of a message that would exemplify a regulatory violation. In some embodiments, the presence of one or more signatures can indicate a regulatory violation. For example, a signature can be (1) an event that includes a reference to a specific individual to whom the adverse event occurred (e.g., "my mother has a headache" and not a generic term such as "everyone gets a headache"); (2) an indication of a compound or form of treatment; (3) an indication that the potential regulatory violating event is a new adverse event not already reported to the FDA or a repeat of an existing violation; and/or (4) an indication that the reporter of the event is accessible (e.g., it is possible to connect to the reporter).

In some embodiments, the compliance device can be, for example, a web server, an application server, a proxy server, a personal computing device such as a workstation or a desktop computer, and/or the like. The compliance device can include a risk analysis module implemented in at least one of a memory or a processing device, where the risk analysis module is configured to receive, from a source communication device, a message addressed to a destination communication module and having an unlocked attachment. The risk analysis module is configured to analyze the content of the unlocked attachment to determine a risk level associated with the content of the unlocked attachment. The compliance device can also include a file tracking module configured to define, based on the unlocked attachment, a locked attachment in response to the risk level satisfying a criterion. The file tracking module is configured to send a message having the locked attachment to the destination communication device such that the destination communication device is unable to modify the locked attachment.

In some embodiments, a non-transitory processor-readable medium includes code representing instructions to be executed by a processor that causes the processor to receive, at a compliance device, and from a source communication device a message addressed to a destination communication device and having an untracked attachment. The code causes the processor to analyze the content of the untracked attachment to determine a risk level associated with the content of the untracked attachment. The code further causes the processor to define, based on the untracked attachment, and in response to the risk level satisfying a criterion a tracked attachment including a tracking portion. Furthermore, the code causes the processor to send a message having the tracked attachment to the destination communication device, and receive from the tracking portion of the tracked attachment a confirmation in response to the tracked attachment being opened at the destination communication device.

As used in this specification, the singular forms "a," "an" and "the" include plural referents unless the context clearly dictates otherwise. Thus, for example, the term "a communication device" is intended to mean a single communication device or a combination of communication devices.

FIG. 1 is a schematic illustration of a system for monitoring and analyzing communications in social media that pass through an enterprise network for enterprise compliance issues, according to an embodiment. The compliance monitoring and analysis system 100 includes a communication device 110, an administration device 120, and a compliance device 150. The communication device 110, the administration device 120 and the compliance device 150 together constitute at least a portion of an enterprise network.

The compliance monitoring and analysis system 100 can be operatively coupled to the communication device 170 and the communication device 180 via a computer network 160. The computer network 160 can be any type of network (e.g., a local area network (LAN), a wide area network (WAN), a virtual network, a telecommunications network, the Internet, etc.) implemented as a wired network and/or a wireless network. As described in further detail herein, in some embodiments, for example, the compliance device 150 can be connected to the communication devices 110, 170 and 180 via an intranet, an Internet Service Provider (ISP) and the Internet, a cellular network (e.g., computer network 160), and/or the like.

The communication device 110 can be a source communication device in the compliance monitoring and analysis system 100, and can be associated with at least one employee of an enterprise such as, for example, a hospital, a pharmaceutical company, a drug company, a medical device company, and/or the like. The communication device 110 can be a computing device such as, for example, a workstation, a desktop computer, a laptop computer, a personal digital assistant (PDA), a standard mobile telephone, a tablet personal computer (PC), and/or so forth. In some embodiments, the communication devices 170 and/or 180 can be destination communication devices. In some embodiments, communication devices 170 and 180 can be associated with one or more social media platform(s) and/or social media website(s). In other embodiments, the communication devices 170 and/or 180 can be a server such as, for example, a web server, an application server, a proxy server, a telnet server, a file transfer protocol (FTP) server, a mail server, a list server, a collaboration server, and/or the like. In still other embodiments, communication devices 170 and 180 can be a workstation, a desktop computer, a laptop computer, a personal digital assistant (PDA), a standard mobile telephone, a tablet personal computer (PC), and/or so forth.

In some embodiments, the compliance device 150 can be a server such as, for example, a web server, an application server, a proxy server, a telnet server, a file transfer protocol (FTP) server, a mail server, a collaboration server and/or the like. In other embodiments, the compliance device 150 can be a workstation, a desktop computer, a laptop computer, or any number of other personal computing devices. In some instances, the compliance device 150 receives a message (such as an email message or a text message) from a (source/employee) communication device 110 that is addressed to a (destination/social media) communication device 170 and/or 180. The compliance device 150 can analyze the content of the message to determine a first risk level associated with the content of the message that can pertain to a preference of an organization or an enterprise. The compliance device 150 can also analyze the content of the message to determine a second risk level associated with the content of the communication that can pertain to a regulatory standard of a specific industry (e.g., healthcare industry, pharmaceutical industry, medical device industry, etc.). Additionally, in some embodiments the compliance device 150 can define a composite risk level associated with the message that is at least in part based on the first risk level and the second risk level, and send a signal notifying the administration device 120 if the composite risk level satisfies a criterion. Furthermore, the compliance device 150 can send the message to the (destination/social media) communication device 170 and/or 180, via the computer network 160. In other embodiments, the compliance device 150 can analyze the content of the message to generate a composite risk level that can be associated with more than two separate risk levels based on performing multiple risk analysis methods on the message.

In other instances, the compliance device 150 can receive a message (such as an email message, text message, message to post to a social media platform(s) and/or social media website(s), etc.) from a (source/employee) communication device 110 that is addressed to a (destination/social media) communication device 170 and/or 180 that can have an untracked attachment. In such instances, the compliance device 150 can analyze the content of the untracked attachment to determine a risk level associated with the content of the untracked attachment. The compliance device 150 can define, based on the untracked attachment, a tracked attachment that includes a tracking portion in response to the risk level satisfying a pre-determined criterion. The tracking portion can include, for example, a Hypertext Transfer Protocol (HTTP) cookie, a third party cookie, a tracking cookie, a JavaScript file, a Portable Document File (PDF) tracking software, and/or the like. The compliance device 150 can send the message with the tracked attachment to the (destination/social media) communication device 170 and/or 180, via the computer network 160. Furthermore, the compliance device 150 can receive from the tracking portion of the tracked attachment, a confirmation signal in response to the tracked attachment being opened at the (destination/social media) communication device 170 and/or 180. Additionally, the tracked attachment can also send periodic requests for updates to the compliance device 150. In some instances, a tracked attachment can be locked to define locked attachment. A (un)tracked and (un)locked attachment are not necessarily the same. For the case of a locked attachment, the contents of the attachment cannot be altered or changed at the destination communication device 170 or 180. A locked attachment may or may not be tracked by the compliance device 150. In other instances, a tracked attachment may or may not be locked. In such instances, the contents of an unlocked attachment can be altered or changed at the destination communication device 170 or 180. Similarly, an unlocked attachment may or may not be tracked by the compliance device 150.

In some embodiments, the administration device 120 can be a server such as, for example, a web server, an application server, a proxy server, and/or the like. In other embodiments, the administration device 120 can be a workstation, a desktop computer, a laptop computer, or any number of other personal computing devices. The administration device 120 can receive from the compliance device 150 notification signals indicative of the risk levels associated with incoming messages, can log instances of the notifications, and/or can send notices of policy and/or rule violations to defined recipients. Such defined recipients can include, for example, communication devices associated with employees of the enterprise, a network administrator of the enterprise, and/or any other executive, administrative and/or information technology personnel of the enterprise. In some instances, the administration device 120 can also channel reports of suspected abuses and compliance policy and/or rule violations to security personnel.

An effectively designed compliance monitoring and analysis system 100 can offer an enterprise several advantages. In some embodiments, the compliance monitoring and analysis system 100 can enable social collaboration in regulated industries by minimizing compliance liabilities. In other embodiments, the compliance monitoring and analysis system 100 can assist in finding insights of topics discussed that are otherwise are not allowed due to risk. In other embodiments, the compliance monitoring and analysis system 100 can allow risk management of conversation taking place in a social context. In other embodiments, the compliance monitoring and analysis system 100 can promote innovation speed due to new ability to collaborate. In yet other embodiments, the compliance monitoring and analysis system 100 can help extend compliance risk free connections to new individuals outside the enterprise that could have otherwise posed potential compliance risk. For example, the compliance monitoring and analysis system 100 can allow devising a method to safely share the results of a novel pilot treatment method with physicians at a separate hospital in order to get expert feedback without risk of potentially loosing intellectual property.

Figure 2:
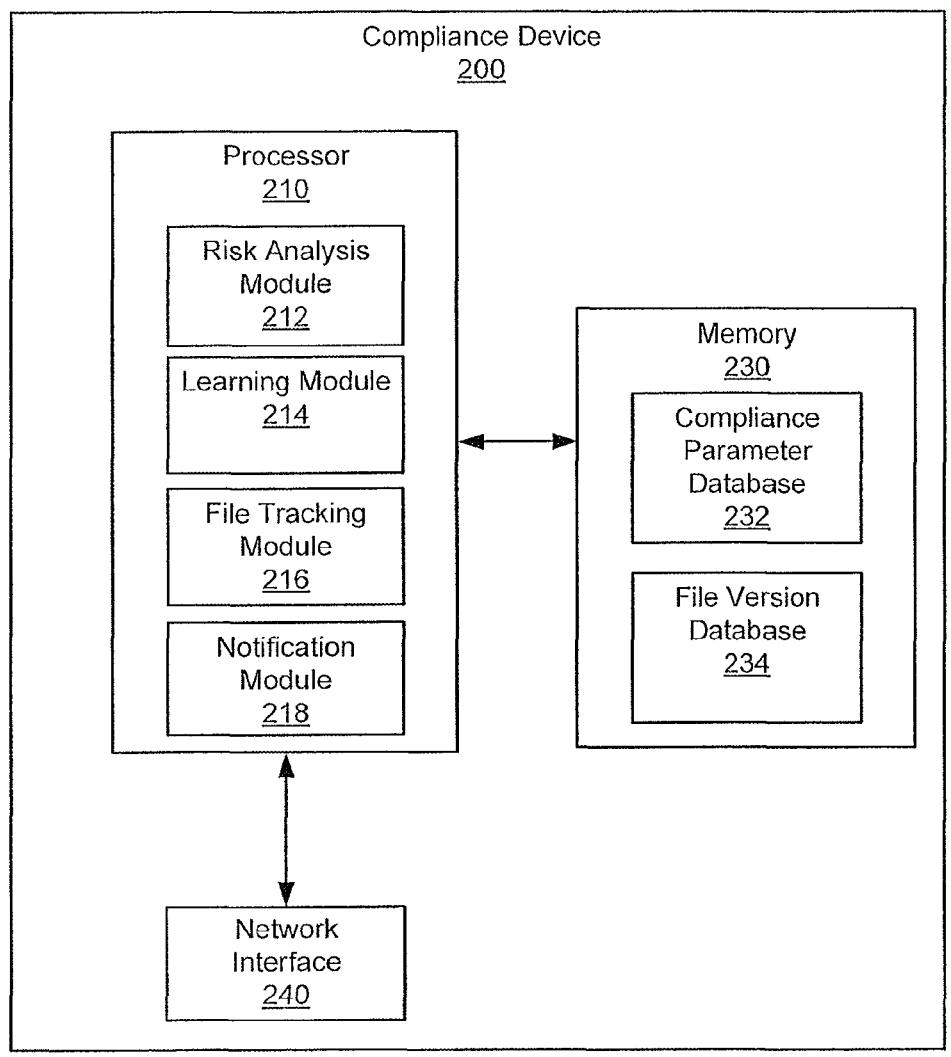
FIG. 2 is a system block diagram of a compliance device, according to an embodiment.

FIG. 2 is a system block diagram of a compliance device 200, according to an embodiment. The compliance device 200 includes a processor 210, a memory 230, and a network interface 240. The memory 230 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 230 is operatively coupled to the processor 210 and can store instructions to cause the processor 210 to execute modules, processes and/or functions associated with the compliance device 200, and/or compliance monitoring and analysis system 100.

The memory 230 includes a compliance parameter database 232 and a file version database 234. The compliance parameter database 232 can contain, for example, entries associated with enterprise and industry compliance policies, risk determination criteria, instructions for the risk analysis module 212 to implement risk analysis methods associated with messages and attachments, instructions for risk analysis module 212 to determine if the risk level associated with a message satisfies a criterion, instructions for the file tracking module 216 to define a locked attachment (based on an unlocked attachment) in response to the risk level satisfying a criterion, and/or instructions for the file tracking module 216 to introduce a tracking portion into the locked attachment.

The file version database 234 can contain entries that are associated with a current version of attachments associated with incoming and/or outgoing messages within the enterprise network. As such, the file version database 234 can maintain a record and/or identifier associated with a current version of an attachment. As described in further detail herein, using the file version database 234, the file tracking module 216 can update and/or replace outdated versions of an attachment.

The processor 210 is operatively coupled to the memory 230 and the network interface 240. The processor 210 can be, for example, a general purpose processor, a Field Programmable Gate Array (FPGA), an Application Specific Integrated Circuit (ASIC), a Digital Signal Processor (DSP), and/or the like. The processor 210 can be configured to run and/or execute modules, processes and/or functions associated with the compliance device 200 and/or the compliance monitoring and analysis system 100. The processor 210 can include a risk analysis module 212, a learning module 214, a file tracking module 216, and a notification module 218.

The risk analysis module 212 can be a hardware module and/or a software module (stored in memory 230 and/or executed in processor 210) that can analyze incoming messages (e.g., email, memos, text messages, messages to be posted on a social media platform(s) and/or social media website(s), etc.). For example, to determine the risk level associated with messages, the risk analysis module 212 can analyze the content of the message, the content of an attachment associated with the message, an identifier associated with the source communication device, and/or an identifier associated with the destination communication device, and/or so forth. In some embodiments, the machine learning method used to analyze the contents of a message and/or any attachments associated with a message can be based on statistical analysis methods that can automatically learn linguistic regulatory risk exposure through the analysis of large corpora of typical real-world social interactions that have accumulated and have been annotated for the correct interpretation. The risk analysis module 212 can analyze the content of a message and/or attachment based on the instructions and compliance policies contained in at least one entry of the compliance parameter database 232 that can address any of the following conditions, where each of the conditions can be scored.

Risk analysis can involve text analysis based on enterprise or industry sensitivity to one or many regulations. In some embodiments, industry specific risk analysis (e.g. for the pharmaceutical industry) can be performed. For example the risk analysis can involve the use of specific language patterns or signatures that use software and large data-sets, for example, to check against a brand name list for improper mentions, a check for disease names mentioned for off-label promotion, a check for potential mentions of adverse events, a check for false claims based on product approvals, a check for pre-commercial approval data disclosure, and/or the like. In other embodiments, the risk analysis can involve text analysis that can include searching for and identifying particular keywords, phrases or terms used within a specific context related to an enterprise such as offensive words, terms suggesting inside knowledge sharing, stress terms, sentiment analysis, and/or the like. In other embodiments, proximity analysis can be performed that can involve checks for keywords, phrases or terms in close proximity to other terms. In yet other embodiments, dialogue and content exchanged by certain individuals on a watch list can be analyzed such as, for example, patients with past criminal records, neurological or psychiatric disorders, individuals whose messages are frequently determined to pose a compliance risk and/or the like. If a message or an attachment associated with a message receives a score that is above a certain threshold score indicative of a risk criterion, the message and/or attachment can achieve a high risk status. Elements of a message that can be analyzed for compliance can include, for example, a title of the message, a body of the message, an identifier (e.g., name, email address, use of hash-tags, user ID, etc.) of the message originator, an attachment in the message, a date of communication, an identifier associated with the source communication device, an identifier associated with the destination communication device, and/or the like.

The risk analysis module 212 can define a tag indicating the results of the risk analysis. Such a tag can include multiple individual risk levels associated with executing different risk analysis methods, as well as a composite risk level that is generated at least in part from the individual risk levels. For example, a risk level can be defined by a numerical score generated by analyzing a message with a particular risk analysis method. The risk analysis module 212 can forward the defined or updated tags and the selected message (with attachments in some instances) to the learning module 214, which can then allow for the implementation of adaptive machine-learning methods.

In other embodiments, the risk analysis module 212 can also implement an attachment compliance method associated with incoming messages with unlocked and/or untracked attachments that can be substantially invisible to the end users (both the source and the destination communication device). In such embodiments, the risk analysis module 212 can analyze the content of the unlocked and/or untracked attachment as described above. The risk analysis module 212 can also generate a composite risk level associated with the unlocked and/or untracked attachment based on the analysis methods discussed above.

The risk analysis module 212 can implement risk analysis methods associated with attachments that can include additional features. In some embodiments, files regardless of extension can be analyzed for risk. In other embodiments, only content specifically designated as approved and specific for a certain group can be allowed to be downloaded from social media platforms. In yet other embodiments, a feature for collaboration and feedback with users (in an enterprise) can be implemented. For example, this feature can provide the opportunity for users (in an enterprise) to add their own criteria for compliance risk that is specific to the enterprise at any time without adversely affecting the relevance of the prior risk criteria.

The learning module 214 can be a hardware module and/or software module (stored in memory 230 and/or executed in processor 210) that can implement machine learning methods. In some embodiments, the machine learning methods can be based on statistical inference that can automatically learn linguistic regulatory risk exposure through the analysis of large corpora of typical real-world social interactions that have been accumulated and have been annotated for the correct interpretation by employees of an enterprise.

In other embodiments, various machine learning methods can combine private and public data procured from the internet and/or from government sources, followed by the enterprise analyzing the data to devise steps to define the basis for flagging messages that can potentially contain compliance violations in the content of the messages and/or in attachments associated with messages. In such embodiments, the data used by the learning module 214 as the basis for decision making capabilities of the compliance device 200 can go through several processing steps. For example, data can be obtained from the internet in large volumes, purchased from third party aggregators, and/or generated internally from source research. The data can be stored and organized within the enterprise network. The data can be evaluated for the risk of possible violations on an individual basis by employees of the enterprise. This can be done in a crowd sourcing method in which experts in the field of the specific regulatory issue can analyze the data and flag the contents (such as specific words or phrases) that can potentially be a compliance risk. The flagged contents can then be indexed for searching at the compliance parameter database 232 in the memory 230 of the compliance device 200.

The file tracking module 216 can be a hardware module and/or software module (stored in memory 230 and/or executed in processor 210) that can implement the attachment compliance method along with the risk analysis module 212 to prevent content impersonation or corruption of the attachments associated with messages passing through the enterprise network. After the attachments are analyzed for compliance risk by the risk analysis module 212, locking, expiration and/or self-verification steps can be performed on the attachments by the file tracking module 216.

If the risk level associated with the content of the attachment of the incoming message (i.e. a message received at the compliance device 200 from the communication device 110) satisfies a pre-determined criterion, the file version database 234 can define a new (updated) entry associated with a new updated locked and/or tracked version of the attachment that is generated at the file tracking module 216 and sent in an outgoing message to a destination communication device 170 and/or 180, as described in further detail herein. The entries of the file version database 234 can be accessed by the file tracking module 216 to determine if the version associated with an opened tracked attachment at the destination communication device 170 and/or 180 is current. If the opened tracked document is found to be out of date, additional entries in the file version database 234 associated with the most recent version of the attachment (or file) can be accessed by the file tracking module 216. The additional entries in the file version database 234 can contain instructions that can be executed at the file tracking module 216 that can allow the file tracking module 216 to send the most recent version of the attachment (or file) to the destination communication device 170 and/or 180 and replace (or update) the previous version of the attachment (or file), as described in further detail herein.

"Locking" can be used to prevent users from editing the contents of attachments uploaded on social media platform(s) and/or social media website(s) or attachments associated with other forms of communications (e.g., email message, text message, SMS message, etc.) that can potentially expose the enterprise to regulatory fines. More specifically, the file tracking module 216 can define, based on the unlocked attachment (which can be tracked or untracked) contained in a message, a locked attachment (which can be tracked or untracked) if the risk level (generated by the risk analysis module 212) satisfies a criterion. Examples of attachments can include, for example, Portable Document Files (PDF), word processor files, spreadsheets, PowerPoint files, image files, executable files, and/or the like. In some embodiments, the locking feature can be implemented, for example, by changing the file extension type of the unlocked attachment, by combining at least one electronic cookie with the unlocked attachment, by adding code to lock the file in a header portion of the file, and/or so forth. In other embodiments, any other suitable method can be used to lock the attachment. Locking the attachments can ensure the contents of attachments cannot be altered at a subsequent time. The file tracking module 216 is configured to send a message having the locked attachment to the destination communication device 170 and/or 180 via the computer network 160 such that the destination communication device 170 and/or 180 is unable to modify the contents of the locked attachment. Note that the message having the unlocked attachment is a first instance of the message (e.g., an email message), and the message having the locked attachment is a second instance of the (email) message. Furthermore, the message having the unlocked attachment can be a first instance of the message intended to be posted on a social networking website, and the message having the locked attachment can be a second instance of the message intended to be posted on the social networking website.

In some embodiments, the file tracking module 216 can define an attachment to include a cookie or metadata that can define an expiration feature such that the attachment is automatically removed from a destination communication device (e.g., destination communication device 170 or 180 of FIG. 1) when an expiration criterion is satisfied. An expiration criterion can be associated with, for example, a time period, a date, a specific number of times an attachment is accessed, and/or the like and can be a functionality used to assist in enforcing compliance. The file tracking module 216 can expire the content of an attachment at any point regardless of the physical location of the attachment. This can occur not only on a web portal but on hard drives, flash sticks or at any location at which an attachment can be found. After the content of an attachment expires, the attachment can delete and/or remove itself from the destination communication device.

In some embodiments, the file tracking module 216 can be configured to include within an attachment a cookie, metadata, or a code in a header that can define a tracking portion and/or module. In such embodiments, the file tracking module 216 can receive a confirmation signal from the tracking portion and/or module of an attachment at a destination communication device (e.g., destination communication device 170 or 180 of FIG. 1) in response to the locked attachment being opened at the destination communication device. Furthermore, the file tracking module 216 can also determine whether the version associated with the tracked attachment is current in response to a notification signal sent to the file tracking module 216. The file tracking module 216 can be configured to update the opened tracked attachment at the destination communication device 170 and/or 180 if the opened attachment is found to be out of date. The unlocked attachment and the locked attachments are instances of a first version of an attachment. The file tracking module 216 is configured to send an instance of a second version of the attachment defined after the first version to the destination communication device 170 and/or 180 such that the destination communication device 170 and/or 180 can replace the first version with the second version at a subsequent time.

The combined functionality of the risk analysis module 212 and the file tracking module 216 can implement the attachment compliance methods, which includes the risk analysis methods, the file locking method(s), and/or the file tracking method(s). The file locking mechanism can ensure that after an attachment is downloaded (e.g., from a social media platform(s) and/or social media website(s), from an email message, etc.) to a destination communication device 170 and/or 180, the attachment will be a substantially duplicative copy of the file the initiator of the attachment (i.e. source communication device 110) created. Additionally, the file tracking module 216 can also implement the tracking mechanism to detect the version of the opened attachment on the destination communication device 170 and/or 180, and update the opened attachment with subsequent later versions that were created by the initiator of the attachment. The implementation of the attachment compliance method can prevent content impersonation or corruption of the attachment from occurring, thus allowing an attachment to remain a substantially identical copy of the original version of the file or any other subsequent version updates that were uploaded by the creator of the attachment in the event the attachment is exposed to potential compliance compromising activity. The compliance device 200 allows all forms of communication associated with social media platforms to proceed to and from the enterprise network, and neither intercepts attachments, nor offers redaction within the attachments, nor alters the destination address of the attachments.

The notification module 218 can be a hardware module and/or software module (stored in memory 230 and/or executed in processor 210) that can be configured to define and send a notification signal and/or message to the administration device 120 in response to the risk analysis module 212 generating a risk level associated with a message and/or an attachment satisfying a criterion that is indicative of compliance risk. The notification signal can include a report containing the results of the compliance analysis and can allow the administration device 180 to monitor, track, and/or report enterprise-wide communication compliance. In some embodiments, for example, the notification module 218 can be configured to define and send an email message, a text message, and/or the like to an administration device 120. In some embodiments, such a message can include the contents of the original message and/or attachment such that an administrator can analyze the contents. In other embodiments, any other suitable type of message and/or signal used to notify an administrator can be used. The network interface 240 can connect the compliance device 200 to a computer network such as the computer network 160 (shown in FIG. 1) and can be, for example, a Local Area Network (LAN) Ethernet interface, a Wireless Fidelity (Wi-Fi) interface, a cellular interface, and/or the like. When an Ethernet network interface is implemented, the network interface 240 can connect the compliance device 200 to, for example, a hardwired computer network. When a Wi-Fi network interface is implemented, the network interface 240 can connect the compliance device 200 to, for example, a wireless computer network. When a cellular network interface is implemented, the network interface 240 can connect the compliance device 200 to, for example, a cellular computer network.

In some embodiments, the network interface 240 can receive a signal associated with a message (such as an email message, a text message, a message to be posted on a social media platform(s) and/or social media website(s), etc.) and the associated risk notification signal from the risk analysis module 212 after the risk analysis module 212 has executed the risk analysis methods on the message. In such embodiments, the network interface 240 can send the risk status notification signal to the administration device 120 and the signal associated with the message to the destination communication devices 170 and/or 180 via the computer network 160. In some embodiments, the network interface 240 can receive a signal associated with a message (such as an email message, a text message, a message to be posted on a social media platform(s) and/or social media website(s), etc.) that contains a locked and/or tracked attachment with a tracking and/or locking portion from the file tracking module 216 and the associated risk notification signal from the risk analysis module 212 after the risk analysis module 212 has executed the risk analysis methods on the attachment. In such embodiments, the network interface 240 can send the risk status notification signal to the administration device 120 and the signal associated with the message containing the locked and/or tracked attachment to a destination communication device 170 and/or 180 via the computer network 160.

In yet other embodiments, the network interface 240 can receive a signal associated with a message (such as an email message, a text message, a message to be posted on a social media platform(s) and/or social media website(s), etc.) from the communication device 110 that can be addressed to the communication devices 170 and/or 180. In such embodiments, the network interface 240 can send the signal associated with the message (and any attachments) to the risk analysis module 212 and/or the file tracking module 216 to perform risk analysis methods, and, in some embodiments, implement file tracking and/or locking to attachment(s) associated with the message. In other embodiments, the network interface 240 can receive a signal associated with a message (such as an email message or a text message) from the communication device 170 and/or 180, via the computer network 160. In such embodiments, the network interface 240 can send the signal associated with the message to the risk analysis module 212 and/or the file tracking module 216 to perform risk analysis methods.

Figure 3:
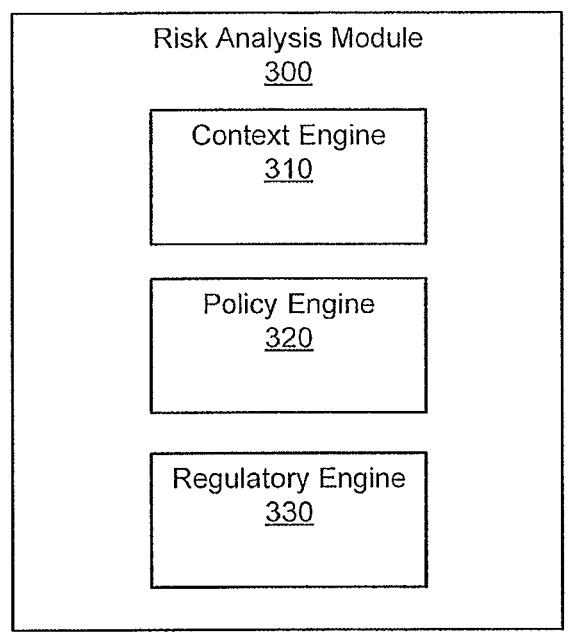
FIG. 3 is a system block diagram of a risk analysis module, according to an embodiment.

FIG. 3 is a system block diagram of a risk analysis module, according to an embodiment. The risk analysis module 300 can be a hardware module and/or software module (e.g., stored in memory 230 and/or executed in processor 210) that can analyze the contents of messages and attachments (e.g., email body, email file attachments, memos, text messages, etc.) passing through the enterprise network. The risk analysis module 300 can be structurally and functionally similar to 212 shown and described with respect to FIG. 2.

The risk analysis module 300 can execute risk analysis steps based on flagged data to analyze a potential compliance risk term in the body of a message and/or within the contents of an attachment associated with a message. Flagged data can include data that has undergone statistical analysis methods during the machine learning phase of the processor 210 described above and is indicative of compliance risk words, terms and/or phrases. In some embodiments, text analysis methods for word deconstruction (e.g., keyword analysis, words/terms within certain proximity of each other, etc.) can be used. The risk analysis module 300 can assign a statistical probability to each term under analysis that can denote the possibility of a compliance risk. Each term can be analyzed and scored by the three engines described herein. The risk analysis module 300 can mark a term as high-risk based on the scores produced by the analyses of one or more of the three engines.

The risk analysis module 300 can include a context engine 310, a universal compliance engine 320, and a regulatory engine 330. Each of the three engines can determine a score. In some embodiments, based on scores from the three engines, a composite risk level can be generated for each analyzed message. For example, each message can be assigned a color code such as green, yellow, and red whereby each color in the color code can indicate the severity of the compliance risk. For the cases of high compliance risk, follow-up actions can be implemented and/or suggested by the risk analysis module 300.

The context engine 310 is an enterprise (such as a corporation or an organization) configurable engine that analyzes text according to a policy assembled by the organization. This organization chooses specific language facets to include in their preferences or policies and applies the preferences and/or policies to certain "channels". In some embodiments, a channel can be a mode of communication. For example, a channel can include a social media platform, a social media website, an email system, a text field and/or so forth, that can be monitored for compliance violations. The context engine 310 can use language facets associated with one or more policies to search and/or analyze the text(s) under analysis to generate a unique risk level. The perceived risks are not universal and can vary from one enterprise to another. The keyword(s), phrases(s), and/or term(s) under analysis can be matched with entries in the compliance parameter database 232 that are indicative of high risk context. A match of the text(s) under analysis with a high risk policy in the context engine 310 can be assigned a first score such as, for example, 50 points. A match of the text(s) under analysis with a medium risk policy in the context engine 310 can be assigned a second score such as, for example, 25 points. In such embodiments, the score assigned to a high risk policy is higher than the score assigned to medium risk policy (i.e., 50>25). Hence the context engine 310 deals with private information or issues that are specific to an enterprise such as, for example, the name of a whistleblower, a new adverse event that occurred in the enterprise, dialogue and content exchanged by certain individuals associated with the enterprise who are on watch list such as, for example, patients with past criminal records, neurological or psychiatric disorders, and/or so forth.

The universal compliance engine 320 and regulatory engine 330 can analyze messages based on machine learning technology. Accordingly, large corpora of keywords, phrases and/or terms indicating potential risk issues that are matched statistically and flagged can be entered into the universal compliance engine 320 and the regulatory engine 330.

The universal compliance engine 320 analyzes messages for universal compliance issues such as, for example, racism, sexism, inappropriate language, inside knowledge sharing, issues of intellectual polices, and/or so forth. The words(s), term(s), and/or phrases(s) searched for by the universal compliance engine 320 are universal and can be, for example, offensive words, terms suggesting inside knowledge sharing, stress terms, problem phrases, key terms close to other terms, sentiment analysis, monitoring scope of conversation, and/or the like. A match of the term under analysis with any of the aforementioned criteria can be assigned a score such as, for example, 25 points. Hence the universal compliance engine 320 deals with universal issues that are pre-configured into the compliance device 150 of an enterprise.

The regulatory engine 330 analyzes messages for compliance with industry specific regulations that an industry (e.g., the pharmaceutical industry) can encounter through the use of "signatures". As discussed above, a signature is a structured model that analyzes text in a message and in some cases can also use results of external compliance analysis for finding a specific pattern in a message (or any other form of communication) that would exemplify a regulatory violation. In some embodiments, the presence of one or more signatures can indicate a regulatory violation. For example, a signature can be an event that includes a reference to a specific individual to whom an adverse event has occurred, an indication of a compound or form of treatment, an indication that the potential regulatory violating event is a new adverse event not already reported to the FDA or a repeat of an existing violation, and/or so forth. Hence a signature can include information associated with, for example, pharmaceutical anti-kick back regulations, false product claims, adverse event mentions, etc. In some embodiments, the words(s), term(s), and/or phrases(s) under analysis can be analyzed for patterns that would indicate improper brand name mentions, other company brand claims, disease names mentioned for off-label promotion, adverse event potential mentions of a brand name, false claims based on product approvals, pre-commercial approval data disclosure, anti-kickback regulation exposure, consequence of treatment monitoring, and/or other criteria. A match of the words(s), term(s), and/or phrases(s) under analysis with any of the aforementioned criteria can be assigned a score such as, for example, 50 points.

A final composite risk level can then be generated by the risk analysis module 300 that is at least in part dependent on the scores generated from each of the analysis engines described above. For example, in some embodiments, the final composite risk level can be generated by adding the scores from each individual risk analysis method. In other embodiments, the final composite risk level can be generated by a weighted average of the scores from each individual risk analysis method, where the weighing factor can be different for each risk analysis method. In yet other embodiments, the final composite risk level can be generated by including only the highest two scores generated by of any two of the three risk analysis modules, and/or so forth.

In some embodiments, the analysis and/or application of specific policies by the different engines of the risk analysis module 300 can vary with respect to the form of communication and/or channel. For example, a first analysis can be performed if the channel is a text message while a second analysis can be performed if the channel is an email message. For another example, the context engine 310 can perform a first type of analysis and/or implement a first policy if the channel is a message sent to a social media website while the context engine 310 can perform a second type of analysis and/or implement a second policy if the channel is an SMS message. Thus, in such embodiments, the analysis of a message can be tailored to the type and/or channel of communication.

Figure 4:
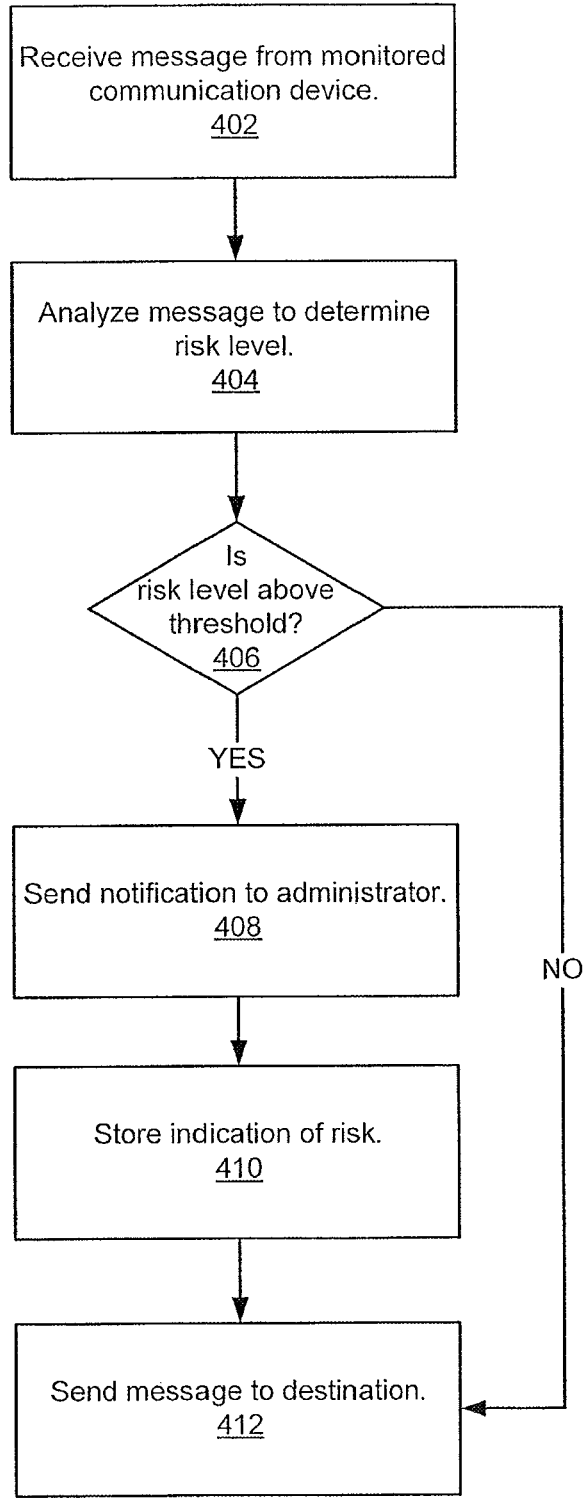
FIG. 4 is a flow chart illustrating a method of analyzing the risk level associated with a message, according to an embodiment.

FIG. 4 is a flow chart illustrating a method of analyzing the risk level associated with a message, according to an embodiment. FIG. 4 is discussed with respect to the compliance monitoring and analysis system 100 (shown in FIG. 1) for convenience, but can be implemented by other compliance monitoring and analysis systems. The method 400 includes receiving at, for example, a compliance device 150, a message from a monitored communication device, at 402. The message can include an email message (with or without an attachment), a text message, a short message service (SMS) message, text to be uploaded to a social media platform(s) and/or social media website(s), and/or so forth. The compliance device can be operatively coupled to one or more communication devices associated with a variety of social media platforms via a computer network. As discussed above, in some embodiments, the compliance device can be a server such as, for example, a web server, an application server, a proxy server, a telnet server, and/or the like. In other embodiments, the compliance device 150 can be a workstation, a desktop computer, a laptop computer, or any number of other personal computing devices. Also, as discussed above, the monitored communication device can be, for example, a workstation, a desktop computer, a laptop computer, a personal digital assistant (PDA), a standard mobile telephone, a tablet personal computer (PC), and so forth.

The method 400 includes analyzing the message at, for example, the compliance device, to determine a risk level associated with the message, at 404. A variety of risk analysis methods can be performed on the contents of the message to generate, for example, a first risk level that can pertain to the preference of an organization or an enterprise, and a second risk level that can pertain to the regulatory standard of a specific industry. The risk analysis methods on the incoming messages can attempt to match the structure of the sentence, keywords, phrases, against policies created with the use of language facets. For example, the risk analysis methods can attempt to match a list of warning words and/or restricted words, and/or a list of warning sentences and/or restricted sentences, against the text in the content of the incoming message. In some embodiments, if a match is identified the analysis can stop and return the appropriate score. In other embodiments, if a match is identified, the analysis can continue and return the appropriate score after analyzing the full contents of the message and/or document. Additionally, a composite risk level associated with the message can be defined that is at least in part based on the first risk level and the second risk level. In some embodiments, the composite risk level can be based on more than two individual risk levels. For example, the composite risk level can be defined based on a third risk level associated with universal compliance issues such as, racism, sexism, inappropriate language, inside knowledge sharing, issues of intellectual polices, and/or so forth in addition to the two risk levels described above.

The method 400 includes determining at, for example, the compliance device, whether the composite risk level computed for the message satisfies a criterion, at 406. The criterion for compliance risk can be determined, for example, by a threshold value for each category of risk type and can be a value computed at, for example, the compliance device, by implementing various risk analysis methods for analyzing of the message as described above. In some embodiments, the criterion for risk can be enterprise defined. In other embodiments, the criterion for risk can be industry defined. In other embodiments, the criterion for risk can be based on learning methods that can analyze potential risk violations that have been rejected by an enterprise. In other embodiments, the criterion for risk can be dependent on the risk level scores associated with the three risk analysis engines with each engine having separate threshold values. In other embodiments, the criterion for risk can be based on the composite risk level generated from the three individual risk level scores. In yet other embodiments, the criterion for risk can be activated if two of the three risk analysis engines generate a risk level above their individual threshold, and/or so forth.

The risk value associated with each high or medium risk keywords, phrases, or terms that can constitute compliance violations can be stored in a compliance parameter database (e.g., compliance parameter database 232 of FIG. 2). In other embodiments, the list of high or medium risk keywords, phrases, or terms can also be stored in the compliance parameter database 232. A direct match or proximity and/or similarity match of the keywords, phases, or terms in the message under analysis with the stored high or medium risk keywords, phrases, or terms in the compliance parameter database 232 can generate a risk score associated with the keywords, phrases, or terms. A composite risk level can be defined based at least in part on the risk levels computed for each high or medium level risk keywords, phrases, or terms detected for the message under analysis. In some instances, certain keywords, phrases, or terms in the message under analysis that can be strongly indicative of extraordinary circumstances such as, for example, criminal activity, terrorist activity etc. can automatically satisfy the criterion for risk regardless of the composite risk level computed for the message under analysis.

The method 400 includes sending the message to the destination if the risk level computed for the message is not found to satisfy a criterion, at 412. In some embodiments, the destination can be, for example, a communication device associated with a social media platform. In other embodiments the destination can be, for example, a destination communication device associated with an outgoing email message, a text message, an SMS message, and/or so forth.

If however, the risk level computed for the message does satisfy the criterion, a notification can be sent to an administrator, at 408. Following implementation of the context and regulatory risk analysis methods on a message, a risk analysis report can be generated based on the first risk level and the second risk level. Additionally, the risk analysis report for the message can also be sent to the administrator along with the notification. As discussed above, the notification can be a notification signal associated with the results of the risk analysis performed at, for example, the compliance device 150. The notification signal can be sent by, for example, the notification module of the compliance device to, for example, the administration device 120. The notification signal can be indicative of compliance risk of the message, and can allow the administration device to log and store instances of compliance violations, and generate a report on enterprise-wide compliance violations in communications (including email messages, text messages, Facebook notifications, etc.) related to various social media platforms and/or other forms of communication.

The method 400 includes storing the indication of risk associated with the message, at 410. The storing of the indication of risk associated with the message can take place at, for example, the compliance device and/or the administration device. As described above, the administration device can receive notification signals indicative of the risk levels associated with incoming and/or outgoing messages, can log and store instances of compliance violations, and/or can send notices of policy and/or rule violations to defined recipients.

The method 400 includes sending the message to the destination, at 412. The contents of the message can be sent in an unaltered form from, for example, the compliance device to, for example, a destination communication device associated with various social media platforms. Even in instances, where the risk analysis performed on the message revealed compliance compromise of the message (e.g., a risk level score that satisfies a criterion), the message is neither intercepted, nor are its contents altered or modified, but it is sent to the destination communication device via a computer network. Additionally, in instances where the message includes attachments, the content of the attachments are neither altered nor modified when sent to the destination communication device.

Figure 5:
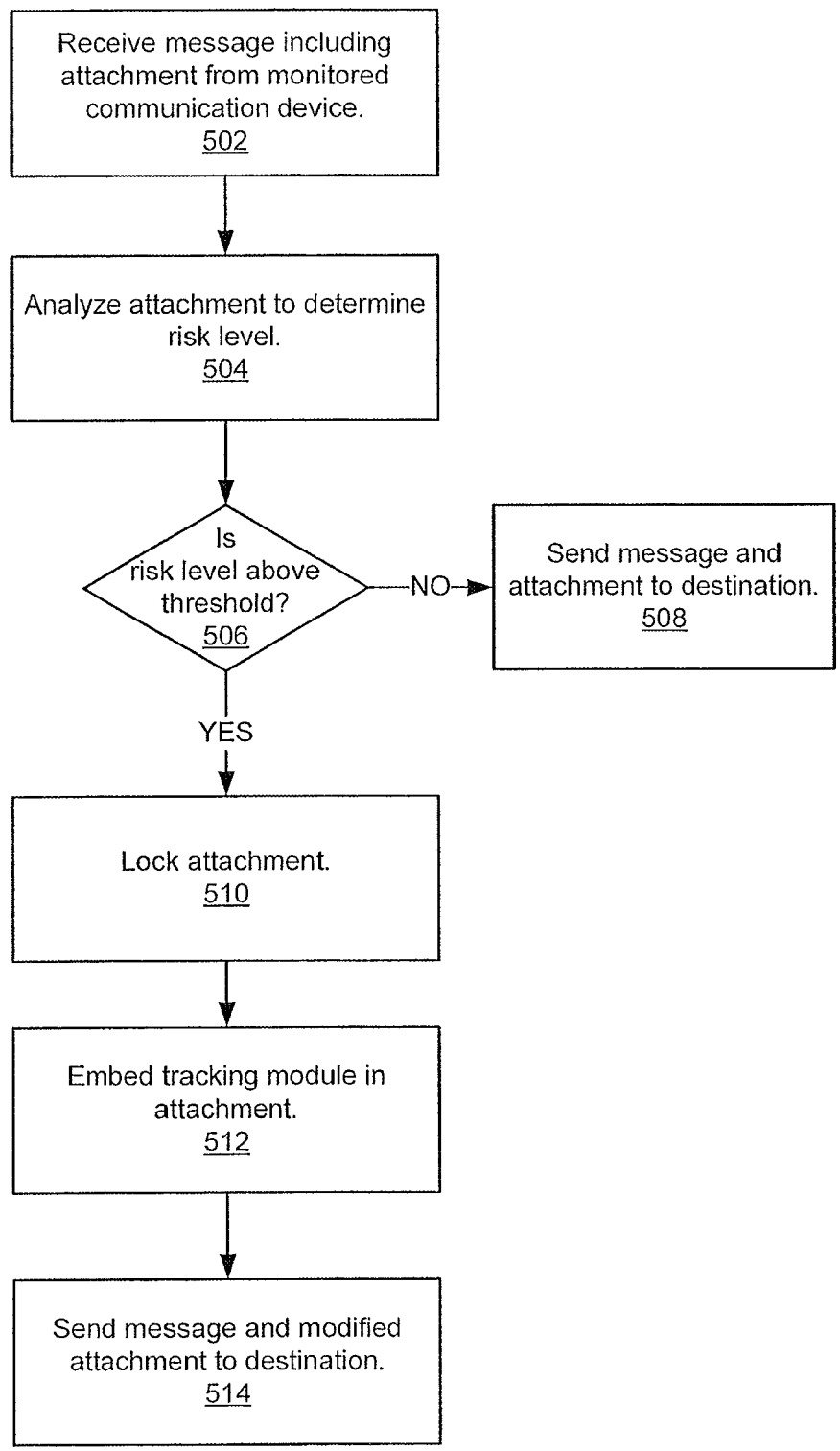
FIG. 5 is a flow chart illustrating a method of analyzing the risk level associated with an attachment of a message, according to an embodiment.

FIG. 5 is a flow chart illustrating a method of analyzing the risk level associated with an attachment of a message, according to an embodiment. The method 500 includes receiving a message including an attachment at, for example, a compliance device and from a monitored communication device, at 502. The message can be sent from a first communication device and can be intended to be received at a second communication different from the first communication device.

The method 500 includes analyzing the attachment at, for example, the compliance device, to determine the risk level associated with the attachment, at 504. Risk analysis of attachments to messages (such as files) shared on a social media platform(s) and/or social media website(s), within email messages, within text messages, etc. can be based on analysis of the text within the attachments against several compliance frameworks as the messages are shared with individuals associated with the enterprise such as, for example, employees, external collaborators, partners, and/or so forth.

The risk analysis method can use, for example, a machine based learning approach to analyze the contents of attachments included in messages for compliance violation. In some embodiments, based on this analysis and the risk profile outcome (that takes into account the context of the dialogue taking place regarding the phrases or terms being analyzed within the attachments), the attachments can be scored, for example, on a low, medium or high risk category. These scores can then be displayed to an enterprise administrator(s) for subsequent action. The specific machine learning methods used to analyze the contents of attachments can be based on statistical analysis of large corpora of typical real-world social interactions that can be accumulated and annotated for the correct interpretation as described in detail in the description associated with FIG. 3.

The method 500 includes determining at, for example, the compliance device, whether the risk level associated with an attachment in a message satisfies a criterion, at 506. The risk level can be represented by the score assigned after the contents of an attachment have been analyzed by the different context, policy and regulatory risk analysis methods described above with respect to FIG. 3. In some embodiments, the criterion for compliance risk can be determined, for example, by a threshold value for each category of risk type and can be a value computed at, for example, the compliance device, by implementing various risk analysis methods for analyzing the contents (text) of the attachments as described above. In other embodiments, the criterion for compliance risk can be based on a single data point instead of a threshold.

The method 500 includes sending the message and the attachment directly to the destination if the risk level computed for the attachment in the message does not satisfy a criterion, at 508. The destination can be, for example, a communication device associated with a social media platform.

The method 500 further includes locking the attachment if the risk level computed for the attachment in the message is found to satisfy a criterion, at 510. As discussed above, locking of the attachment considered high risk can be performed at, for example, the compliance device 200, shown and described with respect to FIG. 2. The locking feature can be implemented, for example, by changing the file extension type of the original unlocked attachment, by combining at least one electronic cookie with the unlocked attachment, and/or so forth. Locking the attachment can ensure the attachment cannot be altered at a subsequent time by a user downloading the attachment from a social media platform(s) and/or social media website(s), an email message, a text message, an SMS message, and/or so forth.

The method 500 includes embedding a tracking module in the attachment, at 512. As discussed above, the embedding of the tracking module in the new locked version of the attachment can be performed at, for example, the compliance device 200, shown and described with respect to FIG. 2. In some embodiments and as described above, the tracking module embedded in the attachment can allow a compliance device to monitor use of the attachment at the destination device, to control a version of the document at the destination device, and/or the like.

The method 500 further includes sending the message and the modified attachment to the destination, at 514. The message and the new locked version of the attachment that includes the embedded tracking module can be sent from, for example, the compliance device to, for example, a destination communication device associated with various social media platforms or a destination communication device associated with an outgoing email message, a text message, an SMS message, and/or so forth.

After the locked attachment is downloaded (e.g., from a social media platform(s) and/or social media website(s), an email, a text message, an SMS message, etc.) and opened at the destination communication device, the embedded tracking module can be configured to read the header of the attachment and/or the message and retrieve the version of the attachment (and other relevant information) opened at the destination communication device. The embedded tracking module can send a confirmation signal confirming the successful opening of the attachment at the destination communication device. Additionally, the embedded tracking module can also send a notification signal to the compliance device containing information associated with the version of the attachment opened, the date the attachment was opened, the number of times the attachment was opened, a destination device identifier, a source device identifier and/or so forth. The notification signal can allow the compliance device, to compare the version associated with the newly downloaded and opened (locked) attachment with the most current version by accessing entries in the file version database associated with the most recent version of the attachment. If the version of the opened attachment in the destination communication device is not found to be current, automatic updating of the opened attachment can be performed by, for example, the compliance device. In some embodiments, the updating process can take before the attachment is downloaded and opened on the destination communication device.

The embedded tracking module can also include an expiration such that the attachment is automatically removed from the destination communication device 170 and/or 180 after the expiration. An expiration can be associated with, for example, a time period, a date, a specific number of times an attachment is accessed, and/or the like. The file tracking module 216 described in FIG. 2 can use the embedded tracking module to expire the content of an attachment at any point regardless of the physical location of the attachment. This can occur not only on the web portal but on hard drives, flash sticks or at any location the attachment can be found. Once the content of an attachment expires, the attachment can be deleted and/or removed from the destination device.

Figure 6:
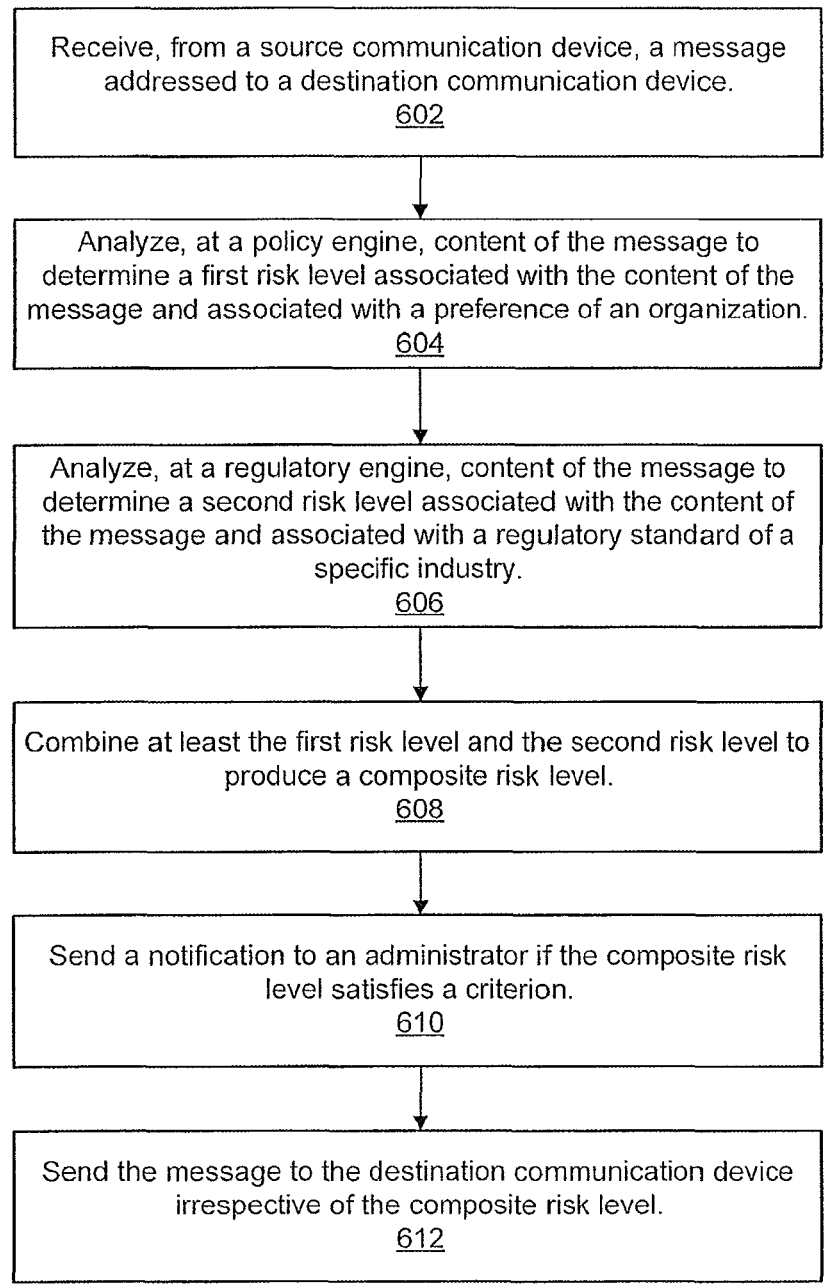
FIG. 6 is a flow chart illustrating a method of generating a composite risk level associated with a message, according to an embodiment.

FIG. 6 is a flow chart illustrating a method of generating a composite risk level associated with a message, according to an embodiment. The method 600 includes receiving from a source communication device, a message addressed to a destination communication device, at 602. The message from the source communication device can be received at, for example, a compliance device. The message can be for example, an email message, a text message, a Twitter notification, a Facebook notification, and/or the like.

The method 600 includes analyzing, at a context engine, the content of the message to determine a first risk level associated with the content of the message and associated with a preference of an organization, at 604. As described above, the context engine can be a risk analysis engine located in a risk analysis module of a compliance device, and can be an enterprise configurable engine that scores the words(s), phrase(s), and/or term(s) under analysis based on keyword analysis and enterprise sensitivity to these keywords. The context engine can search for unique word(s), term(s), and phrase(s) in the message under analysis that is of specific importance to an enterprise. The word(s), term(s), and/or phrase(s) under analysis can be matched with entries in the compliance parameter database that are indicative of high risk words, medium risk words, high risk phrases or medium risk phrases. The context engine deals with private information or issues that are specific to an enterprise such as, for example, the name of a whistleblower, a new adverse event that occurred in the enterprise, etc.

The method 600 includes analyzing, at a regulatory engine, the content of the message to determine a second risk level associated with the content of the message and associated with a regulatory standard of a specific industry, such as for example, the Securities and Exchange Commission, National Association of Securities Dealers, the Health Insurance Portability and Accountability Act of 1996 (HIPAA), the Sarbanes-Oxley Act of 2002, and/or so forth, at 606. As described above, the regulatory engine can be a risk analysis engine located in a risk analysis module of a compliance device (e.g., FIG. 2), and is responsible for implementing risk analysis methods based on industry specific regulations that an industry (e.g., the pharmaceutical industry, medical device industry, etc.) can encounter such as pharmaceutical anti-kick back regulations, false product claims, adverse event mentions, etc. The word(s), term(s), and/or phrase(s) under analysis can be analyzed, for example, for checks against brand name list for improper mentions, other company brand claims, disease names mentioned for off-label promotion, adverse event potential mentions, false claims based on product approvals, pre-commercial approval data disclosure, anti-kickback regulation exposure, consequence of treatment monitoring, and/or the like.

The method 600 includes combining at least the first risk level and the second risk level to generate a composite risk level, at 608. In some embodiments, the composite risk level can be generated by adding the scores from each individual risk analysis method. In other embodiments, the composite risk level can be generated by a weighted average of the scores from each individual risk analysis method, where the weighing factor can be different for each risk analysis method. In yet other embodiments, the composite risk level can be generated by including only the highest two scores generated by of any two of the three risk analysis modules, and/or so forth. The generation of the composite risk level can be performed at, for example, the risk analysis module of the compliance device, after the individual risk analysis engines have generated individual risk levels associated with different regulations.

The method 600 includes sending a notification to an administrator if the composite risk level satisfies a criterion, at 610. In some embodiments, a criterion can be a threshold associated with the composite risk level. In such embodiments, for example, if the composite risk level is above the threshold, the criterion is satisfied. In other embodiments, the criterion can include, for example, potential mention of adverse events in an enterprise, pre-commercial approval data disclosure, terms suggesting inside knowledge sharing, expression of sentiments indicative of criminal activity, offensive words, the name of a whistleblower, and/or so forth. As discussed above, the notification can be a notification signal associated with the composite risk levels generated from the individual risk analysis methods performed at, for example the compliance device. The notification signal can be sent by, for example, the notification module of the compliance device to, for example, the administration device. The notification signal can be indicative of compliance risk of the message, and can allow the administration device to log and store instances of compliance violations, and generate a report on enterprise-wide compliance violations associated with communications in various social media platforms.

The method 600 includes sending the message to the destination communication device irrespective of the composite risk level, at 612. The message can be sent with the contents of the message unaltered and any attachments associated with the message can be sent unaltered or altered (where the initial unlocked and/or untracked version of the file can be altered to a locked and/or tracked version), from for example, the compliance device to, for example, a destination communication device. In some embodiments, even in instances, when the composite risk levels associated with a massage is high, thus indicating a message with high compliance risk, the message is neither intercepted, nor are its contents altered or modified, but it is sent to the destination communication device via a computer network.

The majority of the discussions associated with FIGS. 1-6 above dealt with a system for monitoring and analyzing communications passing through a pharmaceutical company network for enterprise compliance issues. However, the system 100 can also be used for compliance monitoring and analysis of communications associated with any number industries and the various regulatory standards associated with such industries, such as for example, the Securities and Exchange Commission, National Association of Securities Dealers, the Health Insurance Portability and Accountability Act of 1996 (HIPAA), the Sarbanes-Oxley Act of 2002, and/or so forth. For example, in the case of a healthcare provider enterprise, communications between a doctor and a patient's insurance company can be monitored for compliance violations of the HIPAA regulations. In this case, the contents of the communication and the contents of any attachments associated with the communications can be analyzed by the different risk analysis engines and assigned individual HIPAA violation risk levels. A final composite HIPAA violation risk level can be generated, based at least in part on the individual HIPAA violation risk levels to determine a criterion for risk.

In some embodiments, different kinds of risk analysis methods can be implemented by each risk analysis engine on different types of communications (and any associated attachments) passing through an enterprise network. For example, the context engine (310 in FIG. 3) can implement different risk analysis methods to generate a risk level associated with a preference of an enterprise on different types of communications or "channels" such as, for example, email messages, text messages, SMS messages, messages to be uploaded to a social media platform(s) and/or social media website(s), and/or so forth. For example, a first risk analysis method can be performed when the message is an email message and a second risk analysis method different from the first risk analysis method can be performed when the message is a message to be uploaded to a social media platform(s) and/or social media website(s). The universal compliance engine (320 in FIG. 3) and regulatory engine (330 in FIG. 3) can function similarly. Additionally, the risk analysis engines can also implement different threshold levels for determining compliance risk criteria for different kinds of communications (and any associated attachments) passing through an enterprise network. For example, for the case of email messages where the target audience is small, the risk analysis method can perform proximity analysis for two high risk keywords within five adjacent words in the body of a message (or any associated attachment). However, for the case of a message intended for upload on a social media platform(s) and/or social media website(s) where the target audience is large, the potential for adverse events to occur is greater. Hence, the threshold level for determining compliance risk can be more stringent. For example, the risk analysis method can perform proximity analysis for two high risk keywords within twenty adjacent words in the body of a message (or any associated attachment).

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
a risk analysis module implemented in at least one of a memory or a processing device, the risk analysis module configured to receive, from a source communication device, a message addressed to a destination communication device and having an untracked attachment, the risk analysis module configured to analyze content of the untracked attachment to determine a risk level associated with the content of the untracked attachment; and
a file tracking module, remote from the destination communication device, configured to define, based on the untracked attachment, a tracked attachment in response to the risk level satisfying a criterion, the file tracking module configured to send a message having the tracked attachment to the destination communication device such that the tracked attachment sends periodic requests for updates from the destination communication device to the file tracking module, the file tracking module configured to receive, from the destination communication device, a confirmation in response to the tracked attachment being opened at the destination communication device.

2. The apparatus of claim 1, wherein the message having the untracked attachment is a first instance of an electronic mail (email) message, the message having the tracked attachment is a second instance of the email message.

3. The apparatus of claim 1, wherein the message having the untracked attachment is a first instance of a message to be posted on a social network website, the message having the tracked attachment is a second instance of the message to be posted on the social network website.

4. The apparatus of claim 1, wherein the file tracking module is configured to determine that a version associated with the tracked attachment is an outdated version in response to the confirmation, the file tracking module configured to send an updated version of the tracked attachment to the destination communication device such that the outdated version of the tracked attachment is replaced by the updated version of the tracked attachment at the destination communication device.

5. The apparatus of claim 1, wherein the file tracking module is configured to define the tracked attachment to include an expiration associated with a specific number of times such that the tracked attachment is automatically removed from the destination communication device after the tracked attachment is accessed the specific number of times at the destination communication device.

6. The apparatus of claim 1, wherein the untracked attachment and the tracked attachment are instances of a first version of an attachment, the file tracking module configured to send an instance of a second version of the attachment defined after the first version to the destination communication device such that the destination communication device replaces the first version with the second version.

7. The apparatus of claim 1, wherein the risk level is a composite risk level generated at least in part based on two different risk analysis methods.

8. The apparatus of claim 1, further comprising:
a notification module configured to send a notification to an administrator in response to the risk level satisfying the criterion.

9. The apparatus of claim 1, wherein the untracked attachment is unlocked, the file tracking module configured to define the tracked attachment to be locked such that the destination communication device is able to open the tracked attachment but unable to modify the tracked attachment.

10. The apparatus of claim 1, wherein the tracked attachment includes at least one of a cookie, a JavaScript portion, or metadata.

11. A non-transitory processor-readable medium storing code representing instructions to be executed by a processor, the code comprising code to cause the processor to:
receive, from a source communication device and at a compliance device different from the source communication device and a destination communication device, a message addressed to the destination communication device and having an untracked attachment;
analyze, at the compliance device, content of the untracked attachment to determine a risk level associated with the content of the untracked attachment;
define, based on the untracked attachment and at the compliance device, a tracked attachment including a tracking portion in response to the risk level satisfying a criterion;
send, from the compliance device, a message having the tracked attachment to the destination communication device;
receive, from the destination communication device and at the compliance device, a confirmation in response to the tracked attachment being opened at the destination communication device, the confirmation being defined by the tracking portion of the tracked attachment;
determine, in response to the confirmation and at the compliance device, that the tracked attachment is an outdated version of the tracked attachment; and
send, from the compliance device, an updated version of the tracked attachment to the destination communication device such that the outdated version of the tracked attachment is replaced by the updated version of the tracked attachment at the destination communication device.

12. The non-transitory processor-readable medium of claim 11, wherein the code to cause the processor to define the tracked attachment includes code to cause the processor to define the tracked attachment such that the tracked attachment sends periodic requests for updates from the destination communication device to the compliance device.

13. The non-transitory processor-readable medium of claim 11, wherein the message having the untracked attachment is a first instance of a message to be posted on a social network website, the message having the tracked attachment is a second instance of the message to be posted on the social network website.

14. The non-transitory processor-readable medium of claim 11, wherein the risk level is a composite risk level generated at least in part based on two different risk analysis methods.

15. The non-transitory processor-readable medium of claim 11, wherein the untracked attachment is unlocked, the code to cause the processor to define the tracked attachment includes code to cause the processor to define the tracked attachment to be locked such that the destination communication device is able to open the tracked attachment but unable to modify the tracked attachment.

16. The non-transitory processor-readable medium of claim 11, wherein the message having the untracked attachment is a first instance of an electronic mail (email) message, the message having the tracked attachment is a second instance of the email message.

17. The non-transitory processor-readable medium of claim 11, wherein the code to cause the processor to define the tracked attachment includes code to cause the processor to define the tracked attachment to include an expiration associated with a specific number of times such that the tracked attachment is automatically removed from the destination communication device after the tracked attachment is accessed the specific number of times at the destination communication device.

18. The non-transitory processor-readable medium of claim 11, wherein the code to cause the processor to analyze includes code to cause the processor to analyze the content of the untracked attachment for at least one of high risk words, medium risk words, high risk phrases, or medium risk phrases.

19. The non-transitory processor-readable medium of claim 11, wherein the code to cause the processor to define the tracked attachment includes code to cause the processor to include at least one of a cookie or a JavaScript portion in the tracking portion.

20. A non-transitory processor-readable medium storing code representing instructions to be executed by a processor, the code comprising code to cause the processor to:

receive, from a source communication device, a message addressed to a destination communication device and having an unlocked attachment;

analyze content of the unlocked attachment to determine a risk level associated with the content of the unlocked attachment, the risk level being a composite risk level generated based at least in part on two different risk analysis methods;

define, based on the unlocked attachment and in response to the risk level satisfying a criterion, a locked attachment by modifying a file extension type of the unlocked attachment, combining a cookie with the unlocked attachment, or modifying a header portion of the message having the unlocked attachment, content of the locked attachment corresponding to the content of the unlocked attachment; and send a message having the locked attachment to the destination communication device such that the destination communication device is able to open the locked attachment but unable to modify the locked attachment.

21. The non-transitory processor-readable medium of claim 20, wherein the code to cause the processor to analyze includes code to cause the processor to analyze the content of the unlocked attachment for at least one of high risk words, medium risk words, high risk phrases, or medium risk phrases.

22. The non-transitory processor-readable medium of claim 20, wherein the code to cause the processor to analyze includes code to cause the processor to analyze the content of the unlocked attachment based on a standard associated with a specific industry.

23. The non-transitory processor-readable medium of claim 20, wherein the code to cause the processor to define includes code to cause the processor to define the locked attachment to include an expiration associated with a specific number of times such that the locked attachment is automatically removed from the destination communication device after the locked attachment is accessed the specific number of times at the destination communication device.

24. The non-transitory processor-readable medium of claim 20, wherein the destination communication device is a mobile communication device, the code to cause the processor to send includes code to cause the processor to send the message having the locked attachment to the mobile communication device such that the mobile communication device can display the locked attachment.

* * * * *